US007869766B2

(12) United States Patent
Chun (10) Patent No.: US 7,869,766 B2
(45) Date of Patent: Jan. 11, 2011

(54) WIRELESS OPERATIONAL AND TESTING COMMUNICATIONS NETWORK FOR DIVERSE PLATFORM TYPES

(75) Inventor: Craig C. M. Chun, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 955 days.

(21) Appl. No.: 11/329,756

(22) Filed: Jan. 11, 2006

(65) Prior Publication Data

US 2007/0049195 A1 Mar. 1, 2007

Related U.S. Application Data (63) Continuation-in-part of application No. 11/210,189, filed on Aug. 23, 2005.

(51) Int. Cl.
*H04B 17/00* (2006.01)
*H04B 7/19* (2006.01)
*B60C 23/00* (2006.01)
*G05D 1/00* (2006.01)

(52) U.S. Cl. ............... 455/67.11; 455/226.1; 455/13.2; 340/445; 340/447; 244/194

(58) Field of Classification Search ............... 455/13.2, 455/9, 67.11, 67.14, 423, 115.1, 226.1; 340/945, 340/445, 447; 244/194
See application file for complete search history.

(56) References Cited

U.S. PATENT DOCUMENTS

| | | | | |
|---|---|---|---|---|
| 5,535,432 | A * | 7/1996 | Dent | 455/77 |
| 5,951,609 | A * | 9/1999 | Hanson et al. | 701/13 |
| 6,160,993 | A * | 12/2000 | Wilson | 455/12.1 |
| 6,226,493 | B1 * | 5/2001 | Leopold et al. | 455/13.1 |
| 6,252,691 | B1 * | 6/2001 | Porzucki et al. | 398/121 |
| 6,445,907 | B1 * | 9/2002 | Middeke et al. | 455/226.1 |
| 6,778,886 | B2 * | 8/2004 | Hunt | 701/13 |
| 6,825,758 | B1 * | 11/2004 | Laitsaari | 340/442 |
| 7,053,761 | B2 * | 5/2006 | Schofield et al. | 340/447 |
| 7,184,423 | B2 * | 2/2007 | Bryan et al. | 370/338 |
| 7,194,270 | B2 * | 3/2007 | Smith | 455/446 |
| 7,280,498 | B1 * | 10/2007 | Mitchell | 370/316 |
| 7,598,851 | B2 * | 10/2009 | Dagci | 340/521 |
| 2001/0055965 | A1 * | 12/2001 | Delp et al. | 455/420 |
| 2005/0143013 | A1 * | 6/2005 | Jha | 455/69 |

* cited by examiner

*Primary Examiner*—Andrew Wendell
(74) *Attorney, Agent, or Firm*—Gates & Cooper LLP (57) ABSTRACT

An intra-platform wireless communications system is disclosed. The wireless intra-platform communication system comprises a first wireless transceiver, coupled to a platform processor and a second wireless transceiver, coupled to at least one of the subsystems. Platform operational data is communicated between the platform processor and the at least one subsystem via the first and second wireless transceivers.

9 Claims, 8 Drawing Sheets

WIRELESS OPERATIONAL AND TESTING COMMUNICATIONS NETWORK FOR DIVERSE PLATFORM TYPES

CROSS-REFERENCE TO RELATED APPLICATIONS

This application is a continuation-in-part of the following co-pending and commonly assigned patent application, which applications ate incorporated by reference herein:

Application Ser. No. 11/210,189, entitled "WIRELESS SPACECRAFT OPERATIONAL AND TESTING COMMUNICATIONS NETWORK," filed on Aug. 23, 2005, by Craig C. M. Chun.

BACKGROUND OF THE INVENTION

1. Field of the Invention

The present invention relates to systems and methods for routing signals within a system, and in particular to an apparatus and method for wireless intra-platform communications, and for wireless integration testing of such platforms.

2. Description of the Related Art

While often less expensive than terrestrial alternatives, the use of spacecraft to perform surveillance, communication and/or other missions can be costly in both construction and operation. Spacecraft costs are driven by the mass of the spacecraft and the schedule time to integrate and test the spacecraft before launch. Heavier spacecraft require larger weight capacity launch vehicles, the use of which can negatively impact both scheduling and cost.

Onboard spacecraft communications between multiple subsystem components is typically accomplished through traditional shielded wire harnesses and connectors. Ground testing of spacecraft systems is also accomplished through a similar wire harness and connector process. In ground test and integration, the testing schedule revolves around particular test harness configurations and which tests those configurations will allow. Since testing is limited by the test harness configurations there is very little flexibility to the ground test schedule. Further exacerbating the problem, many spacecraft require a stowed configuration to fit into a launch vehicle shroud, and physical access by the test harnesses to components can also be extremely limited to a particular time window in the schedule before the spacecraft is placed in the stowed configuration for eventual launch.

Traditional platform designs have two distinct bodies, payloads that perform the operational mission of the spacecraft, and a bus that provides essential support functions to the payload. Because spacecraft can be difficult or impossible to service in orbit, they are typically designed so that bus' onboard wire harnesses are cross-strapped and redundant for increased reliability. Consequently, a significant mass fraction of a spacecraft is dedicated to payload support functions (including such harnesses and internal wiring) rather than to the payload instrumentation itself.

While infrared spacecraft wireless communications systems have been proposed (for example, U.S. Pat. No. 6,252,691, which is incorporated by reference herein), such systems require an unobstructed line-of-sight between each element in the communications system. This places a difficult design burden due to the limited volume and packaging of on-board spacecraft components, and thus, do not resolve the foregoing technical challenges. Such systems are not inherently cross-strappable and are therefore less robust and less able to adapt to changing communication requirements.

Other platform types, such as piloted and remotely controlled aircraft, launch systems, submersibles, remote monitoring sites and terrestrial vehicles, can have similar difficulties as those described above with respect to spacecraft. Each typically involves the use of extensive wiring harness configurations, substantial integration and test procedures, service difficulties after deployment, and significant communication robustness requirements.

Accordingly, there is a need for a system and method that permits operation and/or testing of diverse platform types without resort to conductive harnesses. The present invention satisfies that need.

SUMMARY OF THE INVENTION

To address the requirements described above, the present invention discloses an intra-platform communications system. The system is used in a platform payload, a platform processor and a plurality of subsystems supporting the payload. In one embodiment, the wireless intra-platform communication system comprises a first wireless non-line-of-sight (NLOS) transceiver, coupled to a platform processor and a second wireless NLOS transceiver, coupled to at least one of the subsystems. Platform operational data is communicated between the platform processor and the at least one subsystem via the first and second wireless NLOS transceivers. Another embodiment discloses a platform communications system comprising an operational platform communications system communicatively coupling the platform processor with the plurality of subsystems and the payload via optically or electrically conductive wire, and a test platform communications system communicatively coupling system test equipment to at least one of the platform processors, the plurality of subsystems and the payload. The test platform communications system comprises a system test wireless NLOS transceiver for wirelessly transmitting test information between the system test equipment and a wireless NLOS transceiver communicatively coupled to the at least one of the platform processor, the plurality of subsystems, and the payload. Another embodiment is evidenced by an apparatus performing intra-platform communications in a platform that comprises a first wireless NLOS transmitter coupled to a first platform element, for transmitting platform operational data from the first platform element, and a first NLOS wireless receiver coupled to a second platform element for receiving the platform operational data from the first platform element. Yet another embodiment discloses a method of performing intra-platform communications in a platform having a plurality of platform elements including a platform processor, a payload, and a plurality of platform subsystems. This method includes transmitting platform operational data from a first NLOS wireless transmitter coupled to a first platform element, and receiving the platform operational data in a first NLOS wireless receiver coupled to a second platform element.

The application of wireless networks to replace traditional wire connectors in both ground testing and deployed operations permits reduction in both the cost of platform build and test operations and the time to complete them. The overall reduction in weight due to the replacement of the onboard wiring harness with lightweight wireless interfaces reduces the weight of the platform and it's related support functions. This allows for more payload instrumentation and/or reduced platform support requirements (i.e. a smaller and/or less complex platforms).

The use of wireless intra-platform communications also facilitates a change in traditional platform design limitations.

Many platform designs have two distinct bodies, a payload and a bus that provides essential support functions to the payload. As payloads become structurally larger, the traditional support functions of the bus are required over a larger dispersed volume. Wireless technologies eliminate many of the limitations of co-located bus functionality and allows the essential payload support functions (i.e. attitude determination and control, navigation, thermal control etc. . . . ) to be distributed where needed. The wireless network can also be applied to send information from one subsystem directly to another (e.g. from an inertial measurement unit directly to a star tracker, rather than through a spacecraft central processor), and also allows some further redundancy to be implemented. For example, each subsystem may have processing capability that can be used in place of a failed processor in another subsystem. Wireless intra-platform communications can also be reprogrammed remotely, allowing the interconnectivity of the platform subsystems to be altered as desired. Such changes can also be implemented by the platform itself either in response to unexpected system failures, changing missions, or adaptively, subject to defined criteria.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
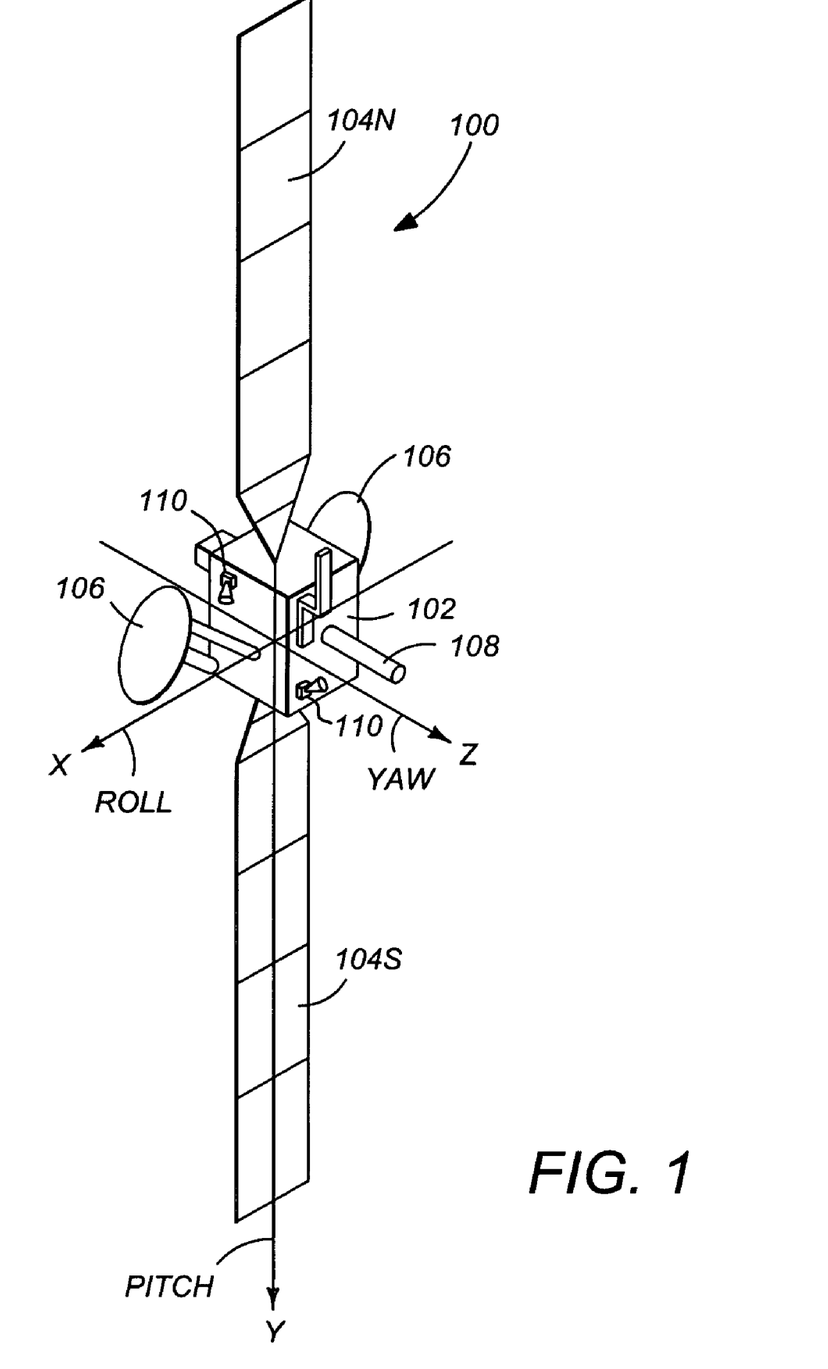
FIG. 1 is a diagram illustrating a three-axis stabilized satellite or spacecraft.

FIG. 1 is a diagram illustrating an exemplary platform comprising a three-axis stabilized satellite or spacecraft 100. The spacecraft 100 has a main body 102, a pair of solar panels 104, a pair of high gain narrow beam antennas 106, and a telemetry and command omnidirectional antenna 108 which is aimed at a control ground station. The spacecraft 100 may also include one or more sensors 110 to measure the attitude of the spacecraft 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively.

The three axes of the spacecraft 100 are shown in FIG. 1. The pitch axis P lies along the plane of the solar panels 140N and 140S. The roll axis X and yaw axis Z are perpendicular to the pitch axis Y and lie in the directions and planes shown. The antenna 108 points to the Earth along the yaw axis Z.

Figure 2:
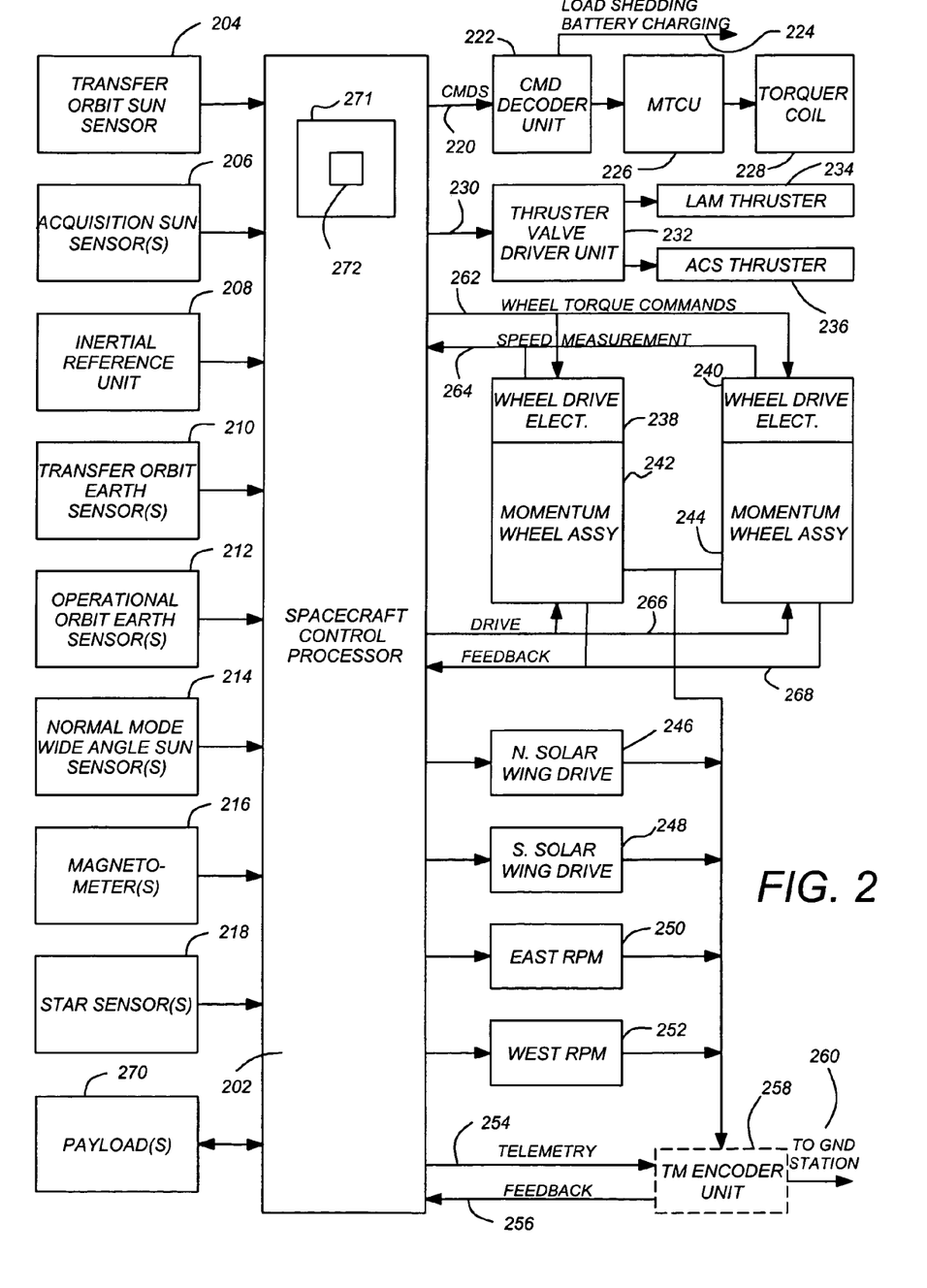
FIG. 2 is a diagram depicting the functional architecture of a representative satellite navigation and control system.

FIG. 2 is a diagram depicting the functional architecture of a representative satellite navigation and control system. Control of the spacecraft is provided by a computer or spacecraft control processor (SCP) 202. The SCP performs a number of functions which may include post ejection sequencing, transfer orbit processing, acquisition control, stationkeeping control, normal mode control, mechanisms control, fault protection, and spacecraft systems support, among others. The post ejection sequencing could include initializing to assent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The stationkeeping control could include auto mode sequencing, gyro calibration, stationkeeping attitude control and transition to normal mode. The normal mode control could include attitude estimation, attitude and solar array steering, momentum bias control, magnetic torquing, and thruster momentum dumping (H-dumping). The mechanisms mode control could include solar panel control and reflector positioning control. The spacecraft control systems support could include tracking and command processing, battery charge management and pressure transducer processing.

Input to the spacecraft control processor 202 may come from a any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218.

The SCP 202 generates control signal commands 220 which are directed to a command decoder unit 222. The command decoder unit operates the load shedding and battery charging systems 224. The command decoder unit also sends signals to the magnetic torque control unit (MTCU) 226 and the torque coil 228.

The SCP 202 also sends control commands 230 to the thruster valve driver unit 232 which in turn controls the liquid apogee motor (LAM) thrusters 234 and the attitude control thrusters 236.

Wheel torque commands 262 are generated by the SCP 202 and are communicated to the wheel speed electronics 238 and 240. These effect changes in the wheel speeds for wheels in momentum wheel assemblies 242 and 244, respectively. The speed of the wheels is also measured and fed back to the SCP 202 by feedback control signal 264.

The spacecraft control processor 202 also sends jackscrew drive signals 266 to the momentum wheel assemblies 242 and 244. These signals control the operation of the jackscrews individually and thus the amount of tilt of the momentum wheels. The position of the jackscrews is then fed back through command signal 268 to the spacecraft control processor 202. The signals 268 are also sent to the telemetry encoder unit 258 and in turn to the ground station 260.

The spacecraft control processor 202 also sends command signals 254 to the telemetry encoder unit 258 which in turn sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260.

The wheel drive electronics 238, 240 receive signals from the SCP 202 and control the rotational speed of the momentum wheels. The jackscrew drive signals 266 adjust the orientation of the angular momentum vector of the momentum wheels. This accommodates varying degrees of attitude steering agility and accommodates movement of the spacecraft as required.

The SCP 202 may include or have access to memory 271, such as a random access memory (RAM). Generally, the SCP 202 operates under control of an operating system 272 stored in the memory 271, and interfaces with the other system components to accept inputs and generate outputs, including commands. Applications running in the SCP 202 access and manipulate data stored in the memory 271. The spacecraft 100 may also comprise an external communication device such as a spacecraft link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 271 and/or data communications devices (e.g. other devices in the spacecraft 100 or on the ground), thereby making a computer program product or article of manufacture according to the invention. As such, the terms "program storage device," "article of manufacture" and "computer program product" as used herein are intended to encompass a computer program accessible from any computer readable device or media.

Figure 3A:
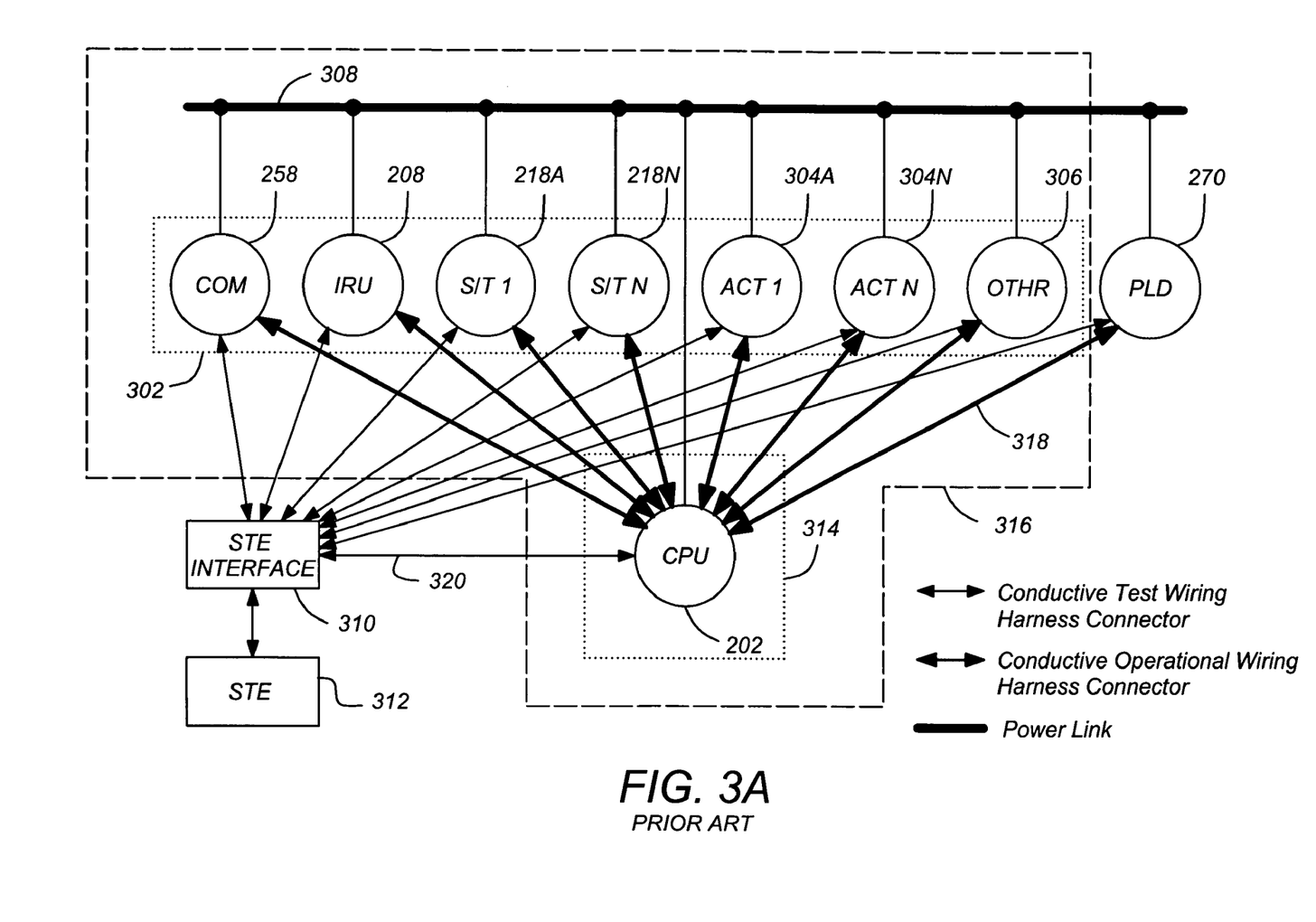
FIGS. 3A and 3B are diagrams showing an conventional wiring configuration.
Figure 3B:
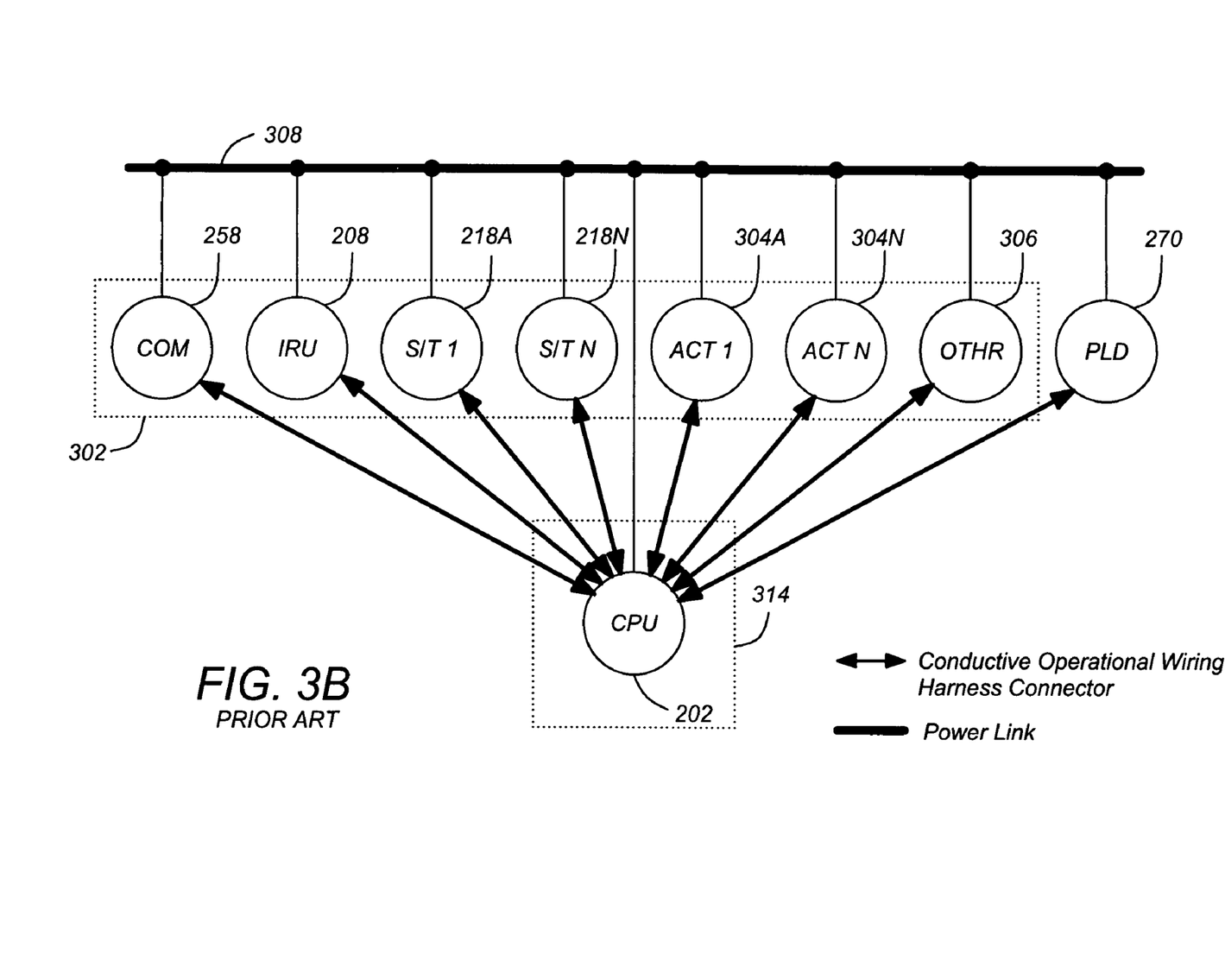

FIGS. 3A and 3B are diagrams showing an conventional wiring configuration.

FIG. 3A shows a conventional wiring configuration for purposes of platform system test and integration. As described above, a platform, such as the spacecraft 100 may comprise a payload 270 and a bus 316. The bus 316 includes one or more processors 314 such as the spacecraft processor 202 (hereinafter alternatively referred to as a central processing unit or CPU) as well as a plurality of subsystems 302 that support the payload 270. FIG. 3A illustrates a ground communication subsystem 258, an inertial reference unit 208, star trackers 218A and 218N, actuators 304A and 304N, and "other" subsystem 306. Power system backplane 308 provides power to the subsystems 302, the processor(s) 314, and the payload 270.

Operational mode conductive (optical and/or electrical) wiring harness connectors 318 are coupled to the processor(s) 314 and one or more of the subsystems 302 and the payload 270. These connectors 318 communicate operational information (e.g. commands, measurements, and the like) between the processor(s) 314 and the payload 270 and the subsystems 302. When the platform is under test, these connectors 318 may also communicate test information as well.

Test mode conductive (also optical and/or electrical) wiring harness connectors 320 are coupled between the system test equipment (STE) interface 310 and the elements of the system, including the processor(s) 314, the payload 270, and one or more of the subsystems 302. These connectors 320 communicate test information (e.g. commands, responses, results and the like) between the STE 312 and the processor(s) 314, payload 270, and subsystem(s) 302 via the STE interface 310. The STE interface 310 also formats and processes data and commands as required to assure compatibility between the STE 312 and the spacecraft 100.

FIG. 3B shows a conventional wiring configuration for an operational (deployed) platform. This wiring configuration is analogous to that of FIG. 3A, without the test mode conductive wiring harness connectors 320.

Figure 4A:
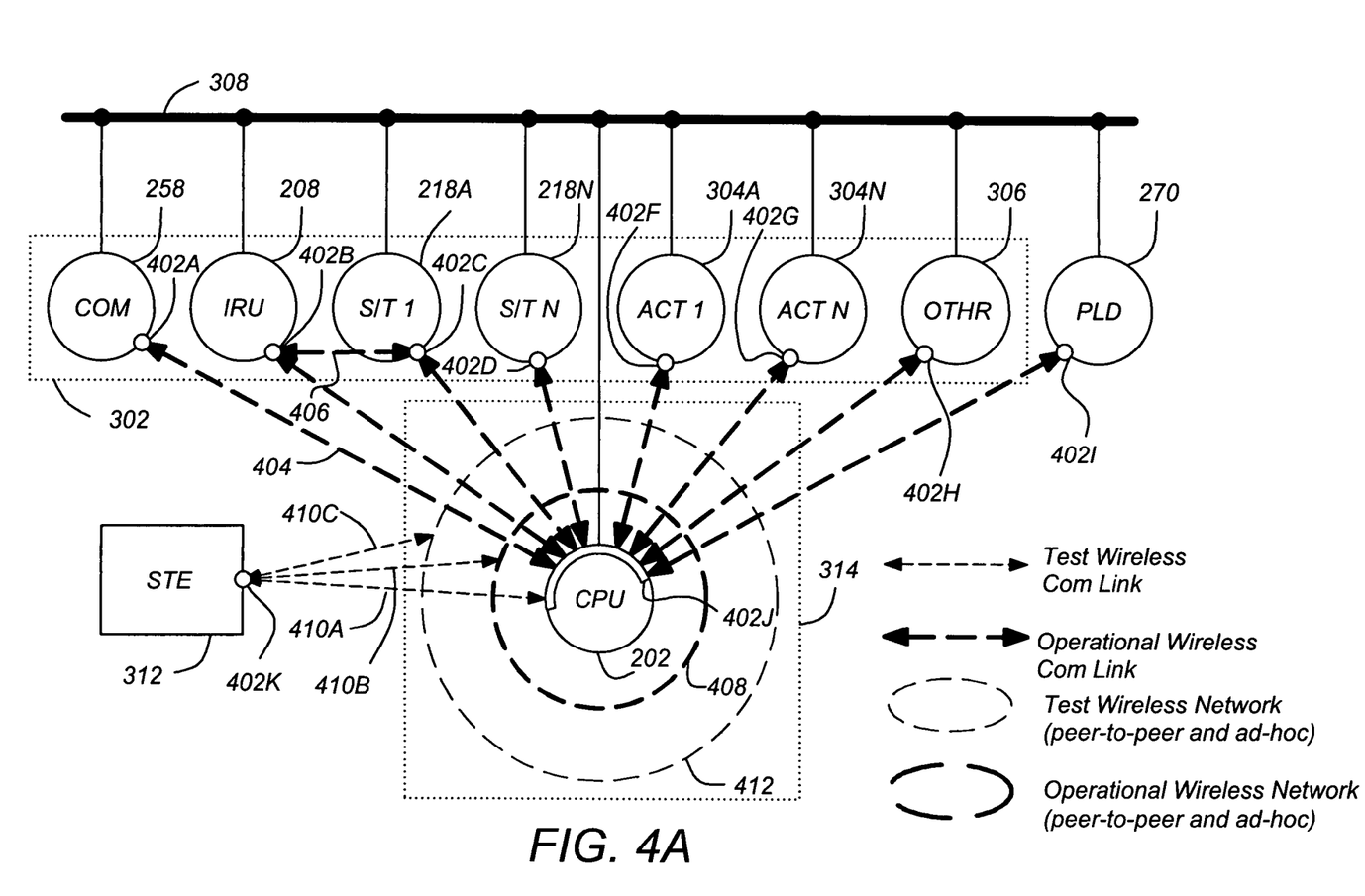
FIGS. 4A and 4B are diagrams illustrating one embodiment of an intra-platform wireless communications network.
Figure 4B:
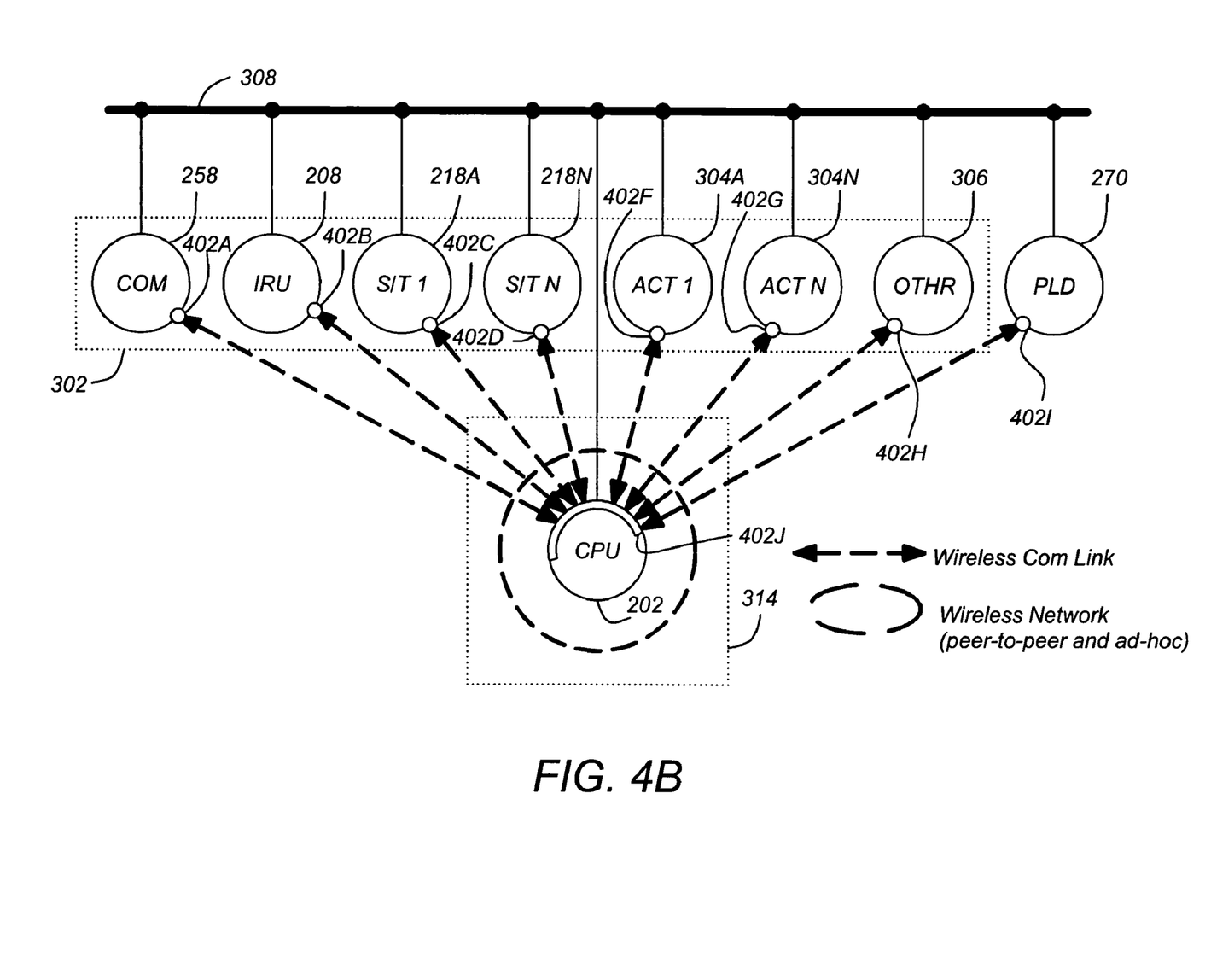

FIGS. 4A and 4B are diagrams illustrating one embodiment of an intra-platform non-line-of-sight (NLOS) wireless communications network. In this embodiment, one or more of the subsystems 302, the payload 270, and the processor(s) 314 each include one or more NLOS wireless transceiver(s) 402A-402H, 402I, and 402J, respectively which communicate operational data between each other as required. The term "NLOS wireless transceiver" as used herein, refers to a communication system which can transmit and/or receive information with another similarly configured "NLOS wireless transceiver" without an electrical or optical hard connection between the two (e.g. by a conductive wire or fiber optic), and whether the transceivers have an unobstructed line-of-sight to one another in at visible or near-visible wavelengths or not. As such, a "NLOS wireless transceiver", as the term is used herein, refers to a NLOS wireless receiver, a NLOS wireless transmitter, or a combination of a NLOS wireless transmitter and receiver, as required. One example of an NLOS transceiver is a radio frequency (RF) transceiver.

Platform operational data can be communicated between the processor(s) 314 and any subsystem 302 and between the processor(s) 314 and the payload 270 using the CPU transceiver 402J and the related transceiver 402A-402I coupled to the subsystem 302 or payload 270 with which communications is desired. Hence, a first wireless transceiver 402J, coupled to the processor(s) 314 and a second wireless transceiver 402A, coupled to the communication subsystem 258 can be used to communicated platform operational data between the processor(s) 314 and the communication subsystem 258. Operational data can also be communicated between the processor(s) 314 and the payload 270 via transceivers (402J and 402I, respectively) coupled to the processor(s) 314 and the payload 270. Further, since the wireless NLOS network permits direct communications between more than one and optionally all of its members, the wireless network is essentially "cross-strapped", and operational data can be communicated directly between subsystems 302 without the processor(s) 314 as indicated by the peer-to-peer nature of network 408. For example, it may be desirable to pass data directly from the IRU 208 to the first star tracker 218A, as shown in link 406. This may be driven by bandwidth or delay considerations, processor(s) 314 limitations or failures, or a number of other possibilities. Although only one operational mode network 408 is illustrated in FIG. 4A, the present invention can be implemented in different topologies including multiple networks communicating with one another. Such networks can be defined by the communication requirements of the members of a particular group of subsystems or payloads. Hence, the multiplexing technique, modulation technique, operating frequency bands, encryption level can be different for each network as the demands of the associated subsystems require. For example, it may be desirable for one of such networks to use a code-division multiple access (CDMA) multiplexing technique, while another may be better implemented with a time-division multiple access technique (TDMA), and another may be better implemented with frequency division multiple access (FDMA) techniques, or any combination thereof.

Platform test information can also be communicated between the STE 312 and the subsystems 302, payload 270 and processor(s) 314, using one or more STE transceivers 402K. The STE 312 can communicate with these entities by communicating with the processor(s) 314 using wireless link 410A and the STE transceiver 402K. Or, the STE 312 can communicate with these entities by communicating with the peer-to-peer network 408. The STE can also communicate with either the processor(s) 314 or the subsystems 302 and payload 270 via a second (test) peer to peer network 412 separate from the operational system peer-to-peer network 408. Of course, the foregoing can be implemented with network architectures other than peer-to-peer, including ad-hoc, hierarchical, and other strategies.

FIG. 4B is a diagram showing one embodiment of the network architecture for intra-platform communications after the platform is deployed.

Transceiver Characteristics

Platform communications must be reliable, secure, compatible with platform hardware components that historically do not support network node and architecture requirements, must support real time data applications, and must be implemented at minimal cost in space, power and money, all characteristics that are not all commonly available in wireless communication systems. To assure adequate reliability, security, compatibility, data throughput and freshness within the space, power and cost constraints, the transceivers 402 of the present invention may comply with IEEE 802.11 Wi-Fi or IEEE Ultra Wide Band reliability standards. This allows the use of commercial off the shelf (COTS) hardware using packet routing protocols that are reliable and resistant to multiple signal interference. Such systems also optimize network paths for throughput reliability and network efficiency.

Signal security requirements can be met using appropriate encryption techniques, including the single or multiple data encryption standard (DES), advanced encryption standard (AES) using the Rijndael symmetric block cipher or other algorithms, or NSA-compliant Fortezza. Spread spectrum and/or low power transception techniques also reduce the probability that any information wirelessly transmitted will be jammed or intercepted. The platform body can also be designed to minimize electromagnetic interference (EMI) to further increase signal security and reliability. Many of the foregoing techniques have been used in Wi-Fi Protected Access (WPA) systems, and can be obtained in COTS equipment.

Space, power, and cost constraints can be met by using small, lightweight wireless components such as those used in wireless laptop computer and personal data assistant (PDA) products. For applications in difficult environments, testing may ensure the reliability of such devices in the environment itself (e.g. space, underwater, or in extreme heat or cold). The present invention makes such testing easier, as test information can be transmitted from within such environments directly to the STE without requiring special STE interfaces.

Conventional network communication architectures require that the nodes include a computing capability to manage and route network traffic. In the past the subsystems 302 and payloads 270 have not included such capabilities, and the cost to upgrade the subsystems 302 to include this capability has been cost-prohibitive. However, many subsystems 302 and components now include dedicated processors and memory with significant capabilities. For example, increasing spacecraft bus performance requirements have driven both star sensors 218 and IRUs 208 to include high performance processors. Such processors now typically support complex command and data handling protocols, and have the processing capacity, throughput, and instruction sets to support wireless communication systems as well. Any additional protocols or hardware required by the subsystems 302 to support a wireless network are well defined in IEEE wireless protocol standards, and can be obtained with commercially available wireless hardware, tailorable to specific spacecraft requirements.

Information networks typically route data using asynchronous switching of data packets from one node to another. Such networks are conventionally thought of as being inapplicable to systems having real-time synchronous data delivery requirements, such as the spacecraft on-board feedback control systems used for navigation and attitude control. That is because most such systems are designed to maximize overall throughput at the expense of synchronous data delivery with minimal latency. However, more sophisticated data handling protocols now allow for multiple levels of data handling applications, including synchronous and asynchronous data packet handling, selective prioritization of data packets and minimum bandwidth requirements. As a side benefit, routing data through network nodes (as represented by the transceivers 402A-K) can reduce node contention and increase throughput reliability.

The performance of the wireless network can also be increased over that which is available with COTS hardware by the use of other techniques, including multi-node voting (in which identical data is collected from multiple nodes and comparison voting is used either at the interface or in the node processor to ensure that the correct information is received), multi-frequency voting (in which the same data is transmitted over multiple frequencies and is compared at the receiving node to determine by a vote if the information is correct). Error correcting codes can also be used to increase transception reliability.

Alternate Embodiments

Figure 5A:
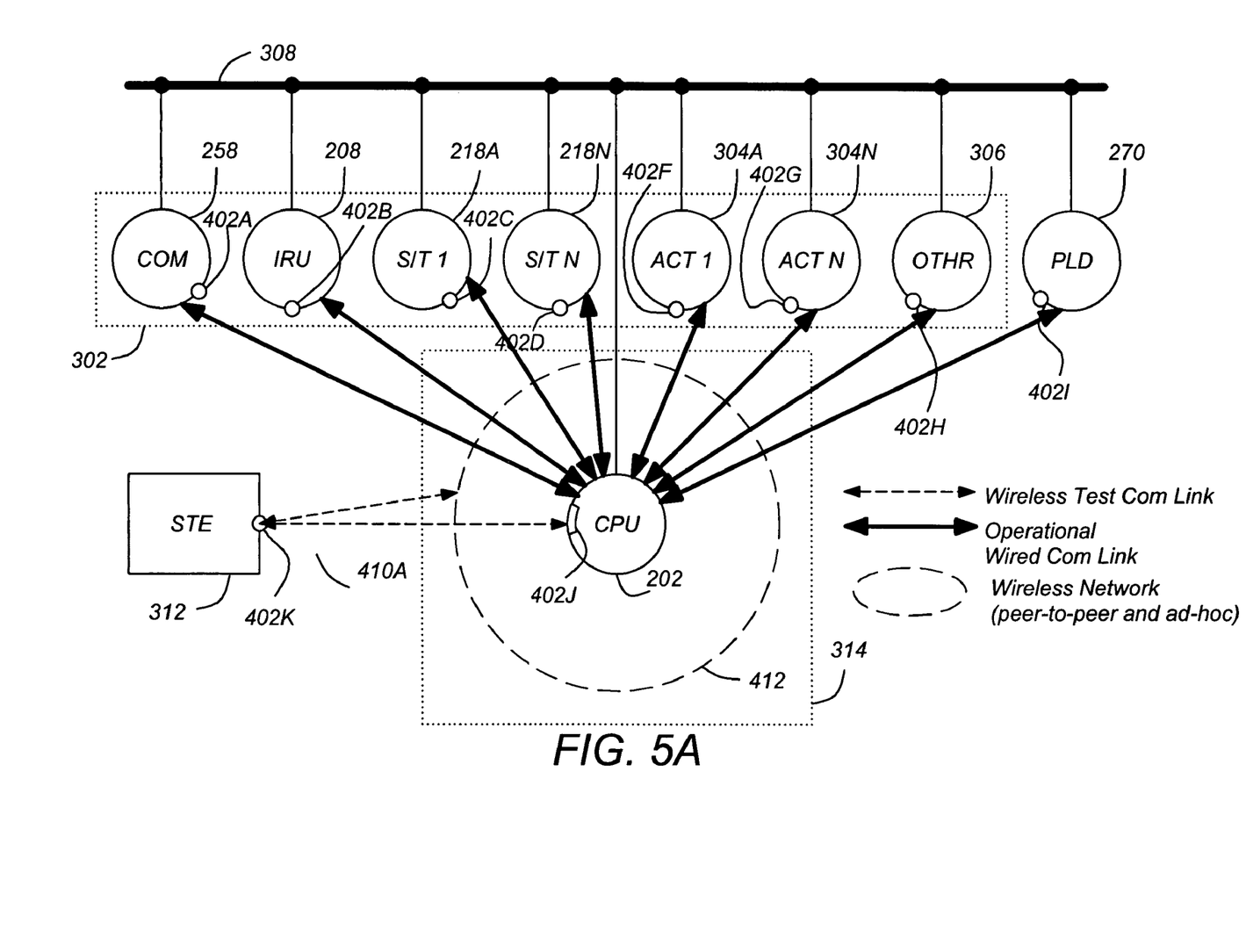
FIGS. 5A and 5B are diagrams illustrating another embodiment of the wireless intra-platform wireless communications network
Figure 5B:
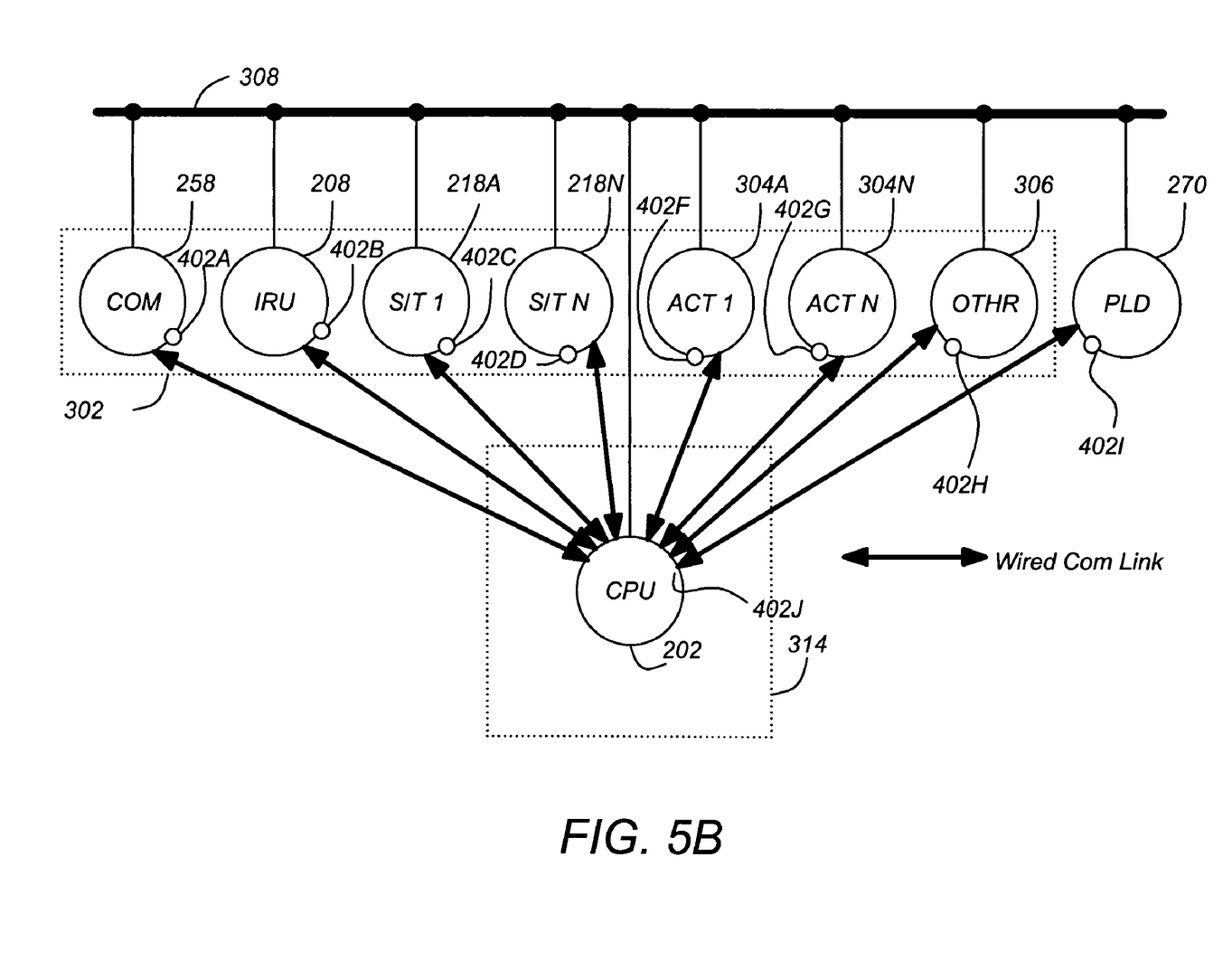

FIGS. 5A and 5B are diagrams illustrating another embodiment of the wireless intra-spacecraft wireless communications network. FIG. 5A is a diagram of a hybrid communications network in a system test mode. This embodiment is advantageous in that it allows testing of otherwise difficult to access subsystems at all times, even when the spacecraft 100 is in the stowed configuration and selected wiring harnesses are unavailable or difficult to reach.

In this embodiment, the STE 312 communicates with the processor(s) 314, the subsystems 302 and the payload 270 using the wireless network, as shown in FIG. 5A, while the system under test (processor(s) 314, payload 270 and subsystems 302) operates in a conventional way such as is illustrated in FIG. 5B.

In another embodiment of the present invention, the wireless network communication system (such as illustrated in FIG. 4B) is used for operational purposes but the test communications network is a conventional wired network, as shown in FIG. 3A.

Non-Spacecraft Applications

As described above, the wireless network can be advantageously used in other (non-spacecraft) platform types. Such platform types can include aircraft (both piloted aircraft and drones), launch systems, submersibles, and terrestrial vehicles such as automobiles. The platform may also be stationary or mobile. One example of a stationary platform is an instrumented remote monitoring site. Such platforms generally include systems and subsystems analogous to those described in the above example, in which the platform comprises a spacecraft.

Such platform types share many of the assembly, deployment, and operational difficulties involved with spacecraft platforms. All require extensive component build procedures as well as extensive system integration and testing before deployment. All have similar manufacturing and operational processes that require communications between subsystems that are conventionally provided via wire harnesses and connectors, and all involve either remote operations or other service inaccessibility problems where system health monitoring and redundant communication paths are beneficial or necessary. As with spacecraft applications, the benefits of the wireless network include (1) a reduction in onboard platform mass, (2) savings in component build and system integration and test time, (3) onboard operational efficiencies and robustness that are provided by wireless routing of data through alternate and/or multiple network nodes and paths rather than only hardwired routes, and (4) operational maintenance, health monitoring and servicing functions that no longer require wire harnesses and connectors for platform testing.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An intra-platform communications system for use with a platform having a payload, a processor, and plurality of subsystems supporting the payload, comprising:
   a first non-line of sight (NLOS) wireless transceiver, coupled to the processor;
   a second NLOS wireless transceiver, coupled to at least one of the subsystems; and
   a fourth NLOS wireless transceiver, coupled to another of the subsystems;
   wherein platform operational data is remotely reprogrammably communicated between the processor and the at least one subsystem via the first and second wireless transceivers and directly between the at least one subsystem and the another of the subsystems via the second NLOS wireless transceiver and the fourth NLOS wireless transceiver without the first NLOS wireless transceiver; and
   wherein the operational data is encrypted before transmission and decrypted after reception and wherein the operational data is communicated between the processor and the at least one subsystem according to a communication parameter having a first value and the operational data communicated directly between the at least one subsystem and another of the subsystems is communicated according to the communication parameter having a second value differing from first value, and the communication parameter is selected from the group comprising multiplex technique, operating frequency band, and encryption level.

2. The apparatus of claim 1, further comprising:
   a third NLOS wireless transceiver, coupled to the payload; and
   wherein the platform operational data is communicated between the processor and the payload via the first and third NLOS wireless transceivers.

3. The apparatus of claim 1, further comprising a third NLOS wireless transceiver, coupled to the payload for communicating platform operational information, wherein the platform operational data is remotely reprogrammably communicated directly between the at least one subsystem and the payload via the second NLOS wireless transceiver and the third NLOS wireless transceiver without the first NLOS wireless transceiver.

4. The apparatus of claim 3, wherein the platform operational data is also communicated between the at least one subsystem and the payload via the first NLOS wireless transceiver.

5. The apparatus of claim 1, further comprising:
   a third NLOS wireless transceiver, coupled to the payload;
   a system test communications system, the system test communications system comprising:
      a system test NLOS wireless transceiver, coupled to system test equipment, for communicating test information between the system test equipment and a transceiver selected from the group consisting the first NLOS wireless transceiver, the second NLOS wireless transceiver, and the third NLOS wireless transceiver.

6. The apparatus of claim 5, wherein the system test NLOS wireless transceiver communicates test information between the system test equipment and the second NLOS wireless transceiver or the third NLOS wireless transceiver via the first NLOS wireless transceiver.

7. The apparatus of claim 5, wherein the system test NLOS wireless transceiver communicates test information directly between the system test equipment and the second NLOS wireless transceiver or the third NLOS wireless transceiver without the first NLOS wireless transceiver.

8. The apparatus of claim 1, wherein the platform operational data is transmitted via a spread spectrum.

9. A method of performing intra-platform communications in a platform having a plurality of platform elements including a platform processor, a payload, and a plurality of platform subsystems, comprising the steps of:
   encrypting and transmitting platform operational data from a first non-line-of-sight (NLOS) wireless transmitter coupled to a first platform element;
   receiving and decrypting the platform operational data in a first NLOS wireless receiver coupled to a second platform element;
   wherein at least a first portion of the platform operational data is transmitted directly from the first platform element to the second platform element without the platform processor according to a communication parameter having a first value;
   wherein at least a second portion of the operational data is transmitted between the platform processor and at least one of the platform subsystems according to a second communication parameter having a second value differing from the first value, the communication parameter selected from the group comprising multiplex technique, operating frequency band, and encryption level; and
   wherein the communications with the second platform element are remotely reprogrammably selectable to be between a second platform subsystem and a third platform subsystem.

* * * * *